(12) United States Patent
Blonskey et al.

(10) Patent No.: US 10,652,059 B2
(45) Date of Patent: May 12, 2020

(54) MISSION CRITICAL WIRELESS COMMUNICATION LINK MASTER GATEWAY

(71) Applicant: CoreTigo, Ltd., Netanya (IL)

(72) Inventors: Ofer Blonskey, Even Yehoda (IL); Eran Zigman, Sde Varburg (IL); Dan Wolberg, Yanuv (IL)

(73) Assignee: CORETIGO, LTD., Netanya (IL)

( * ) Notice: Subject to any disclaimer, the term of this patent is extended or adjusted under 35 U.S.C. 154(b) by 0 days.

(21) Appl. No.: 16/446,004

(22) Filed: Jun. 19, 2019

(65) Prior Publication Data

US 2019/0386860 A1    Dec. 19, 2019

Related U.S. Application Data

(60) Provisional application No. 62/686,926, filed on Jun. 19, 2018.

(51) Int. Cl.
*H04L 27/14* (2006.01)
*H04B 17/336* (2015.01)
*H04B 7/19* (2006.01)
*H04B 7/155* (2006.01)
*H04B 1/16* (2006.01)
*H04W 88/16* (2009.01)

(52) U.S. Cl.
CPC ............ *H04L 27/14* (2013.01); *H04B 1/16* (2013.01); *H04W 88/16* (2013.01)

(58) Field of Classification Search
CPC ......... H04L 27/14; H04B 1/16; H04B 7/2125; H04B 7/1858; H04B 7/19; H04B 7/18582; H04B 7/2123; H04B 7/15542; H04B 7/155; H04B 7/2606; H04W 88/16; H04W 84/047
See application file for complete search history.

(56) References Cited

U.S. PATENT DOCUMENTS 5,710,765 A *   1/1998   Lee ................. H04J 3/0682
                                              348/E7.07
6,240,076 B1 *  5/2001   Kanerva ............ H04B 7/2659
                                              370/330

(Continued)

OTHER PUBLICATIONS

IO-Link Wireless Systems Extensions, Specification, Version 1.1, Mar. 2018, Order No: 10.112, Copyright IO-Link Community 2018, Karlsruhe, Germany, pp. 1-302.

(Continued)

*Primary Examiner* — Pablo N Tran
(74) *Attorney, Agent, or Firm* — M&B IP Analysts, LLC

(57) ABSTRACT

A master gateway operable in a wireless system is provided. The master gateway includes a plurality of receivers configured to wirelessly communicate over the mission critical wireless link system with a plurality of devices; a processing circuitry coupled to the plurality of receivers; and a memory containing instructions that, when executed by the processing circuitry, configure the processing circuitry to at least control the operation of the plurality of receivers, such that at least one of the plurality of receivers is configured to receive a plurality of transmissions from the plurality of devices in succession wherein a guard time between transmissions is significantly smaller than a processing time of a receiver.

7 Claims, 12 Drawing Sheets

(56) References Cited

U.S. PATENT DOCUMENTS

| | | | | |
|---|---|---|---|---|
| 8,280,421 | B2* | 10/2012 | Nanri | H04L 1/0001 |
| | | | | 455/458 |
| 9,001,876 | B2* | 4/2015 | Kim | H04B 7/155 |
| | | | | 375/222 |
| 9,210,581 | B2 | 12/2015 | Toepke et al. | |
| 10,084,535 | B1* | 9/2018 | Speidel | H04B 7/01 |
| 2005/0157694 | A1* | 7/2005 | Lu | H04J 3/1694 |
| | | | | 370/345 |
| 2015/0331827 | A1 | 11/2015 | Beyer et al. | |
| 2016/0162433 | A1 | 6/2016 | Kammerer et al. | |
| 2018/0088563 | A1 | 3/2018 | Gutekunst et al. | |
| 2019/0199431 | A1* | 6/2019 | Speidel | H04B 7/18532 |

OTHER PUBLICATIONS

Erceg, et al., "Wireless LANs TGn Channel Models," IEEE P802. 11, May 10, 2004.

Wolberg, et al., "Simulative Performance Analysis of IO-link Wireless," 4th IEEE International Workshop on Factory CommunicationSystems (WFCS), Jul. 5, 2018.

\* cited by examiner

MISSION CRITICAL WIRELESS COMMUNICATION LINK MASTER GATEWAY

CROSS REFERENCE TO RELATED APPLICATIONS

This application claims the benefit of U.S. Provisional Application No. 62/686,926 filed on Jun. 19, 2018, the contents of which are hereby incorporated by reference.

TECHNICAL FIELD

The present disclosure relates generally to the network control of components within an industrial system, and, more particularly, to an implementation of a mission critical wireless communication link between a master and multiple industrial component.

BACKGROUND

Industrial systems include a variety of components, including a multitude of sensors and actuators, that are implemented to execute various automated tasks in order to produce a desired product or carry out a specific process. Each individual industrial component is typically controlled, e.g., an actuator is instructed to move a robotic arm in a particular manner, or communicated with, e.g., a sensor value reading is received to adjust a process accordingly.

As shown in FIG. 1A, an industrial system 100 is used to direct individual connections, e.g., via cables 110, to connect a controller, such as a programmable logic controller (PLC) or Programmable Automation Controller (PAC) 115, to each component 120 of the system 100. This is a costly setup and produces many inefficiencies, as it requires a multitude of controllers, even for a single machine having multiple components. The control signal was transmitted using an analog or a digital signal sent over the individual cables 110. While simple in theory, such a setup requires high maintenance, high setup costs, and significant amounts of time spent configuring and setting up each component of the system.

Alternatively, industrial systems, as shown in FIG. 1B, include a mission critical link system 130 with a master gateway (or simply "master") 140 connected to a controller 115 and configured to communicate with multiple industrial components 160. The master 140 offers a more centralized approach, with a single master 140 connected to many components 160. The connection may be established over direct cable 150 connections. A standardized protocol, such as IO-Link®, is an example implementation of such a system.

A master 140 is configured to connect to multiple devices (e.g., devices that may operate as "slaves" in a master-slave star topology) 150, which may be easily connected to actuators, sensors, and the like. The sensors may include smart sensors providing valuable diagnostic information as well as updated status reports.

However, this setup retains a number of the drawbacks of the older systems, most notably the requirement for physical cables to be run between a controller and each component of the system. The setup of such wiring is expensive, time-consuming and can be significantly limiting in many industrial applications. For example, running cables in a sealed "clean" room used in many industries can be awkward and can compromise the sealed nature of the room. Further, certain mobile systems that require automated vehicles, e.g., robots configured to move stock or equipment around a warehouse, would be heavily encumbered by requiring a physical cable be attached to each vehicle.

In response to these concerns, a mission critical wireless link (MCWL) system, as shown in FIG. 1C, has been developed to implement a mission critical link system over wireless communication, obviating the need for cumbersome wires. The IO-Link® Wireless (IOLW) specification is an example of a mission critical wireless link system and describes a time-division multiplexing (TDM) network configured to communicate with multiple devices. The master downlink is a single broadcast message per a master track (i.e., one message sent for all devices within a track), while the multiple devices and components use a synchronous (i.e., synchronized by an external clock) TDM method for uplink. The master tracks are synchronized and use frequency-division multiplexing (FDM). The master 140 is therefore connected via a wireless link to the various devices 160.

FIGS. 2A and 2B show the uplink packet structure of an exemplary mission critical wireless link connection of a single track 230 within the system. In this example, the mission critical wireless link is an IO-Link Wireless system. The packets are serially sent wirelessly, i.e., one after the other, from various components 220 to the master 140 with a predefined delay between each packet. In the wireless IO-Link standard, such a delay is 8 microseconds (μs) and the gap can be jittered down to 4 μs. The master 140 may be configured to implement frequency hopping to minimize any interference of ambient wireless signals. Per frequency out of the hopping frequencies table, the master 140 is configured to send a downlink message to all devices within the track 230, with up to 8 devices per track. As an example, if the start of the synchronization time of the downlink is marked as T=0 μs, then a first device uses time slot 0, 232, to start its uplink at $T_0$=416+208=624 μs. The next device uses time slot 1, 234, which start at $T_1=T_0+104$ μs =728 μs. The period 233 between each packet is 8 μs.

As shown in FIG. 3A, the network configuration of an IO-Link wireless network 300 includes one master 140 with five channels or tracks 315. Each track 315 is connected to a wireless antenna 320 and is configured for TDM between up to eight devices 325. The five tracks 315 run simultaneously using frequency spaced hopping sequences.

FIG. 3B is a graph 350 of the spectrum of the industrial, scientific, and medical (ISM) band running a mission critical wireless link network. The ISM band is a group of radio frequencies (RF) that are internationally designated for use in the industrial, scientific, and medical fields. In one such band, the channels are spaced apart by 1 megahertz (MHz) and include the range from 2400-2480 MHz. Each channel may have one or more wireless transmitters transmitting over that channel. The relative amplitudes, as seen by a receiver for such signals, are affected by the distance between the receiver and the transmitter, the transmitter's transmission power, and any channels placed between the two. The channel may include nulls, where the signal cancels out almost entirely, causing large attenuation on adjacent channels.

As shown in FIG. 3B, it is important to note that a desired signal, e.g., 360, may be significantly less powerful than a neighboring undesired signal, e.g., 370, due to the fact that the transmitter being used may be positioned farther away from the receiver than the undesired transmitter. It should be noted that at a receiving port of the master 140 (i.e., the antenna 320 of a track), each time may have a different receiving power as a function of distance and fading of the channel in use.

FIG. 4 is a diagram of an exemplary implementation of a master 140 on an IO-Link network. Due to the short delay between the packets, each track might require at least two independent transceivers 410 and 420 that toggle between the packets, as the short delay between the packets is typically shorter than the processing time of the transceivers 410 and 420, thus prohibiting a single modem from handling all of the incoming packets efficiently. The delay is typically resolved by employing two independent transceivers per track as shown in FIG. 4. In another configuration, the master 140 includes two radios per track.

Although this option offers full usage of the radio in a sparse TDM network, the implementation of such a master is costly because it requires additional receivers in the transceivers to keep a single receiver at maximum gain and not allow an automatic gain control (AGC) to converge. If an automatic gain control converges, the adjacent channel rejection (i.e., a carrier-to-interference ratio, or C/I performance) is hindered significantly. Another requirement is to have the AGC converge on the first packet and maintain the AGC convergence value for the rest of the packets. This, however, hinders sensitivity to subsequently received signals.

FIG. 5 is an example block diagram of a conventional implementation of a receiver, generally referenced as 500, as part of a master's transceiver operable in an IO-Link Wireless network. In the shown architecture, there are multiple feedback loops, including one from the AGC 510 to the low-noise amplifier (LNA) 525, from the AGC 510 to a voltage gain amplifier (VGA) 530, and another one from the carrier frequency offset (CFO) correction 550 to a rotator. A packet detector correlator 560 issues a reset for all components of the receiver 500 when a packet preamble is detected. All control loops and configurations, such as the AGC gain 510 controlling the LNA 525 and VGA 530, are reset simultaneously when the previous packet reception has ended and the receiver 500 is ready to receive the next packet. The receiver 500 is effectively completely reset to an initial state before a new packet reception begins. An example of such an implementation can be found in many Bluetooth and Wi-Fi receivers.

The implementation of a receiver 500 operating in an IO-Link network master suffers from a major limitation: the synchronous reset of all control loops and state machines prohibits beginning to receive a new packet until the preceding packet has been completely received by all elements of the chain. In this example, a maximum likelihood sequence estimator (MLSE) 535 must clear the entire bit stream before a reset to the entire modem can be issued. Since a guard time between the packets is shorter than the processing time of the entire chain (the antenna to bit stream), a separate receiver is required to receive the next packet. Therefore, at least two independent receivers must be implemented in a master gateway using such a receiver 500 architecture.

In the case of two receivers per track, one receiver would receive the odd numbered packets, while the second would receive the even numbered packets.

FIG. 6 is a diagram of the timing differences between an IO-Link 600 and a BLE 610 implementation. In the IO-Link 600 setup, there is a short time gap 650 between the packets. In the BLE implementation 610, the minimum time gap is 150 μs, while in the IO-Link implementation the minimum gap last 4 μs (under a worst-case jitter and severe fading channel scenario).

Therefore, there is a need for a wireless IO-Link implementation that allows for maximal performance (C/I performance and sensitivity), while only requiring one receiver per track to minimize costs.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Some example embodiments disclosed herein include a master gateway operable in a wireless system. The master gateway comprises a plurality of receivers configured to wirelessly communicate over the mission critical wireless link system with a plurality of devices; a processing circuitry coupled to the plurality of receivers; and a memory containing instructions that, when executed by the processing circuitry, configure the processing circuitry to at least control the operation of the plurality of receivers, such that at least one of the plurality of receivers is configured to receive a plurality of transmissions from the plurality of devices in succession wherein a guard time between transmissions is substantially shorter than a processing delay of the transmissions by the at least one receiver.

Some example embodiments disclosed herein also include a receiver configured to wirelessly communicate with a plurality of devices. The receiver comprises a synchronous modem controller configured to control a receiver to receive a plurality of transmissions from a plurality of devices in succession, wherein a guard time between transmissions is substantially shorter than a processing delay of the transmissions by the receiver.

Some example embodiments disclosed herein also include a method for receiving a plurality of packets in sequence. The method is performed in a receiver and comprises: detecting a first packet; decoding a first packet; reconfiguring at least one component of the receiver when said component's operation on the decoded first packet is completed; detecting a second packet; and decoding a second packet with at least one reconfigured component, wherein a guard time between the first packet and second packet is shorter than a time requires to decode the first packet and second packet by the receiver.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
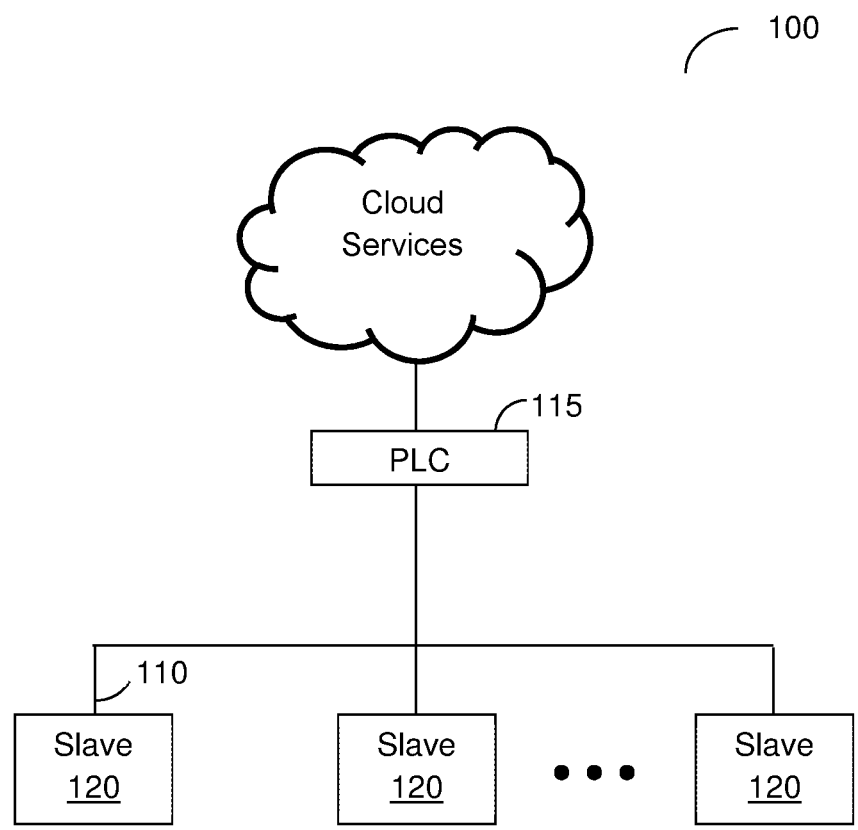
FIGS. 1A and 1B are diagrams of standard techniques for controlling industrial components.
Figure 1B:
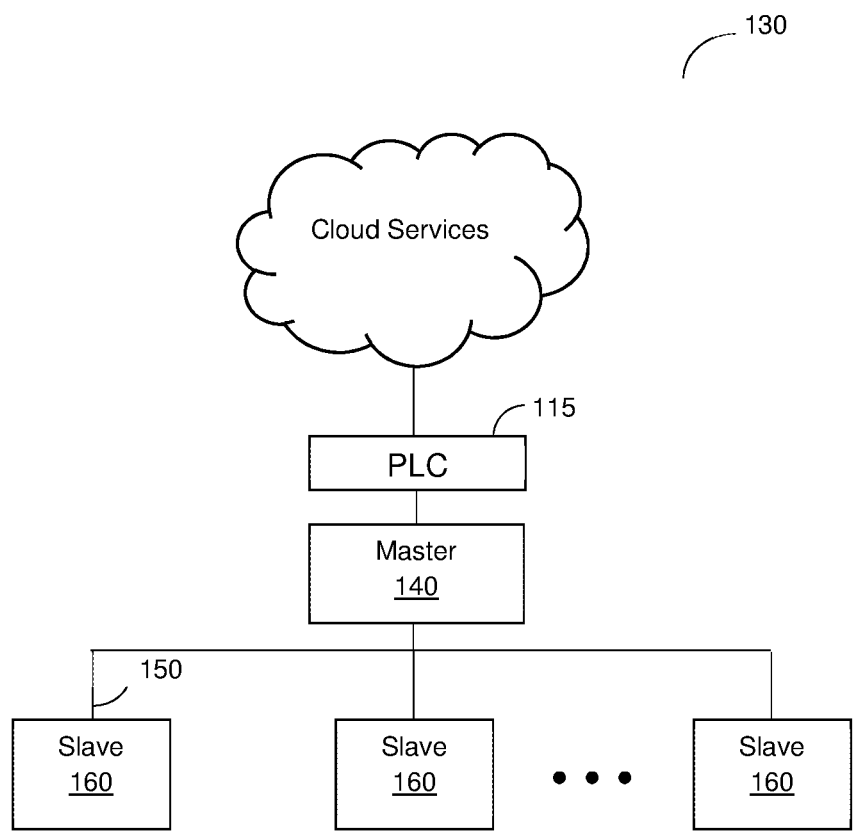
Figure 1C:
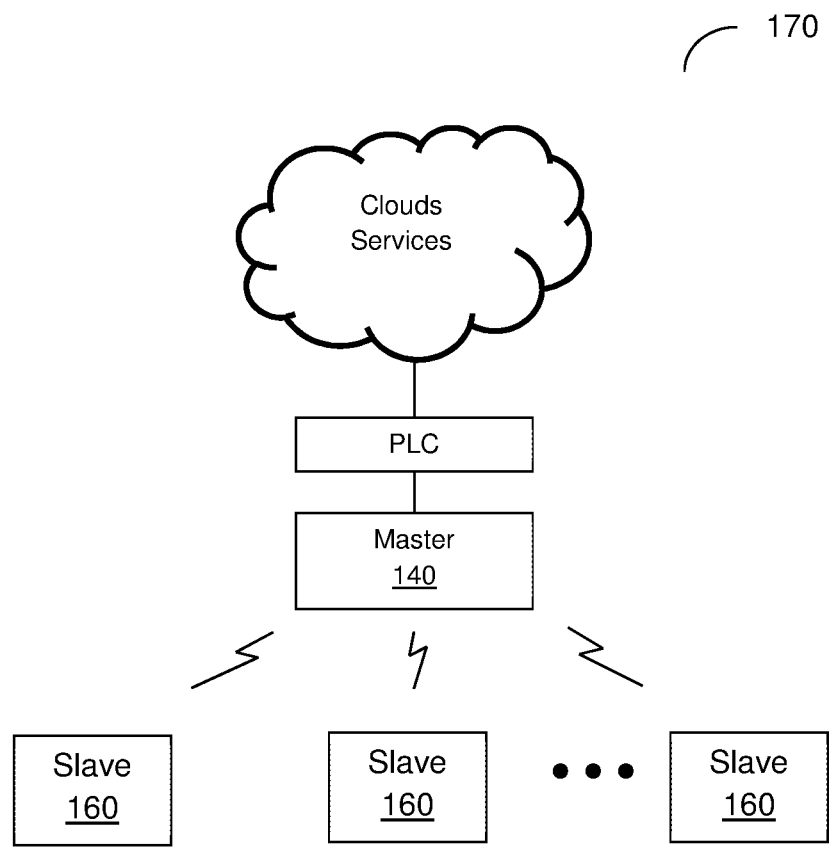
FIG. 1C is a diagram of an additional standard technique for controlling industrial components.
Figure 2A:
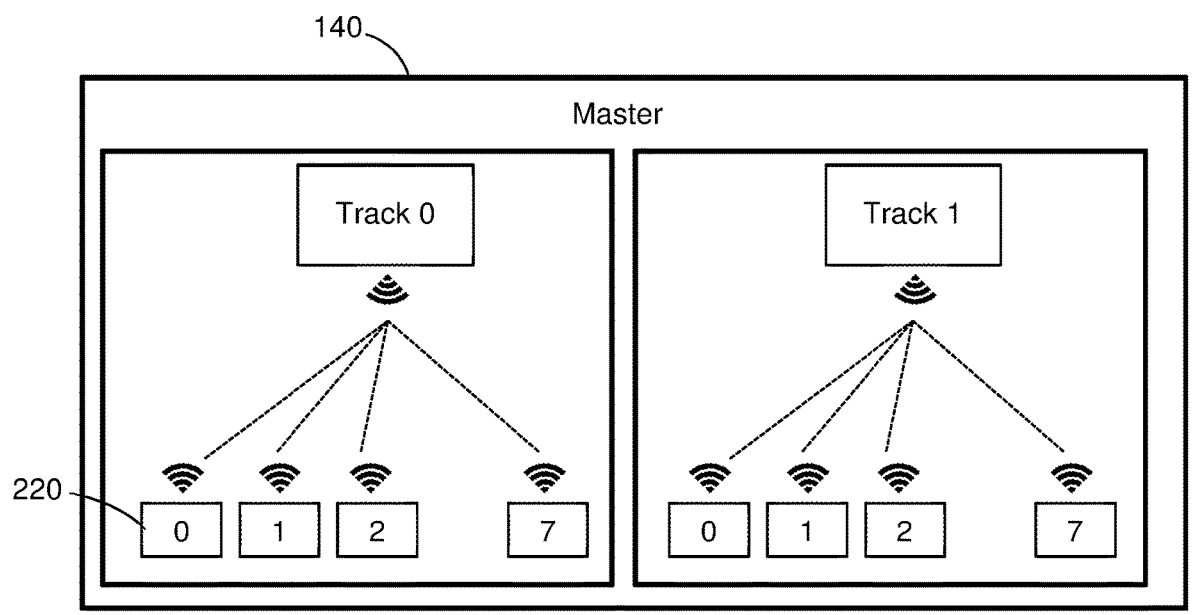
FIGS. 2A and 2B are diagrams of an uplink and downlink packet structure in an IO-Link implementation.
Figure 2B:
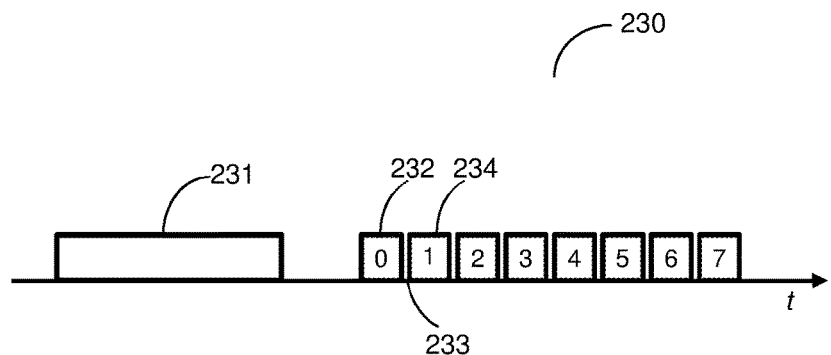
Figure 3A:
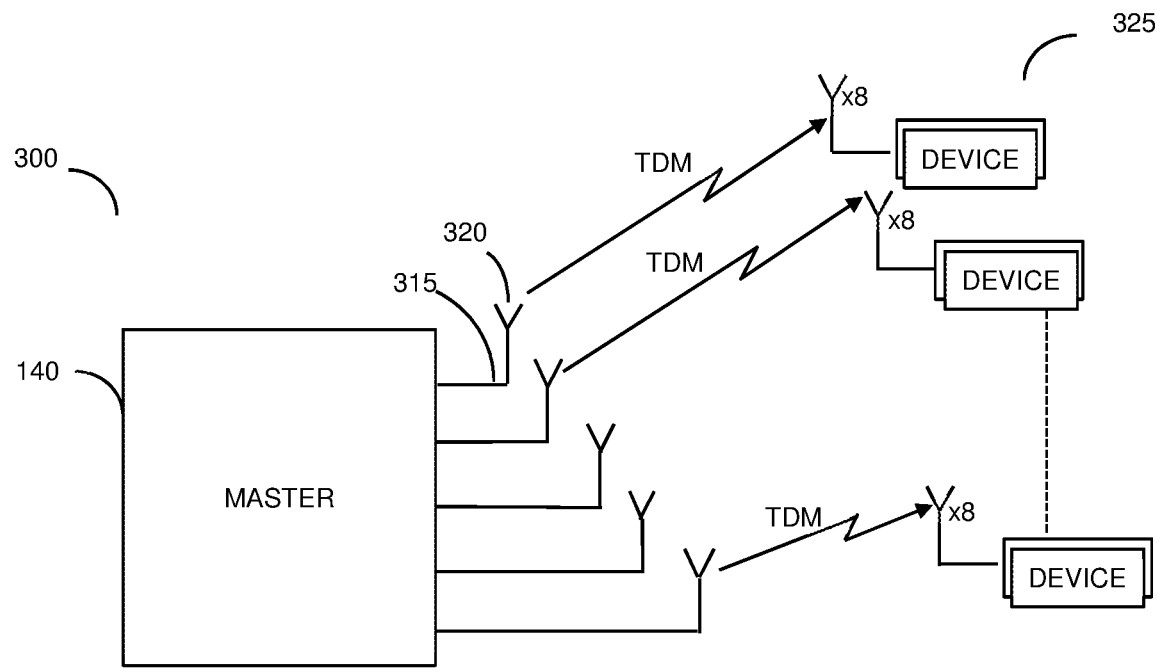
FIG. 3A is a network diagram of an IO-Link network with a master.
Figure 3B:
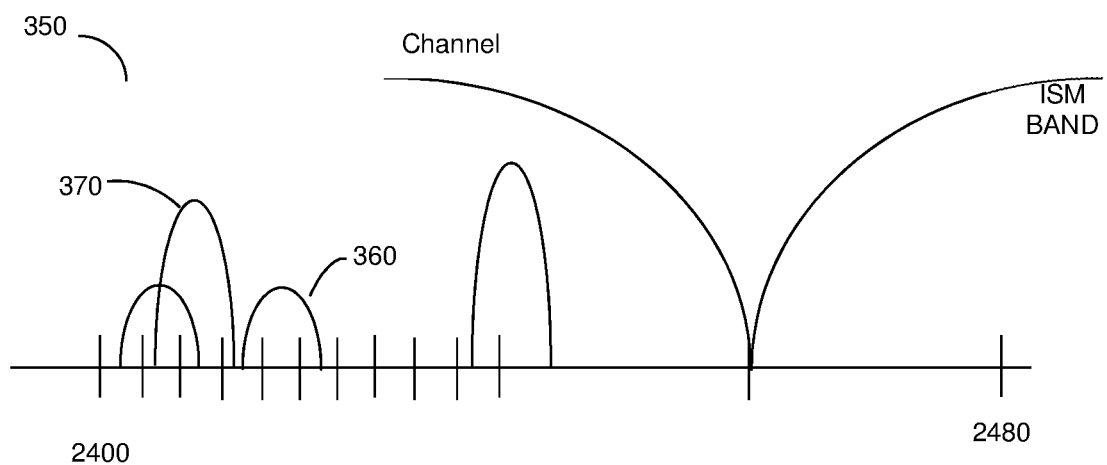
FIG. 3B is a schematic spectrum plot of the ISM band depicting a fading channel with interferers.
Figure 4:
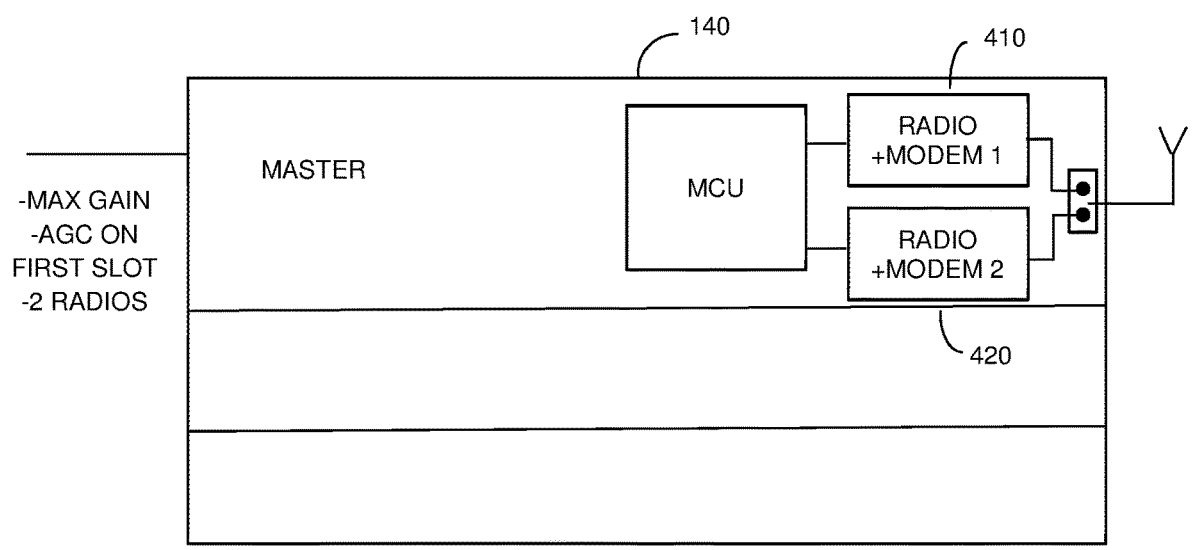
FIG. 4 is a diagram of an exemplary implementation of a track within a master gateway.
Figure 5:
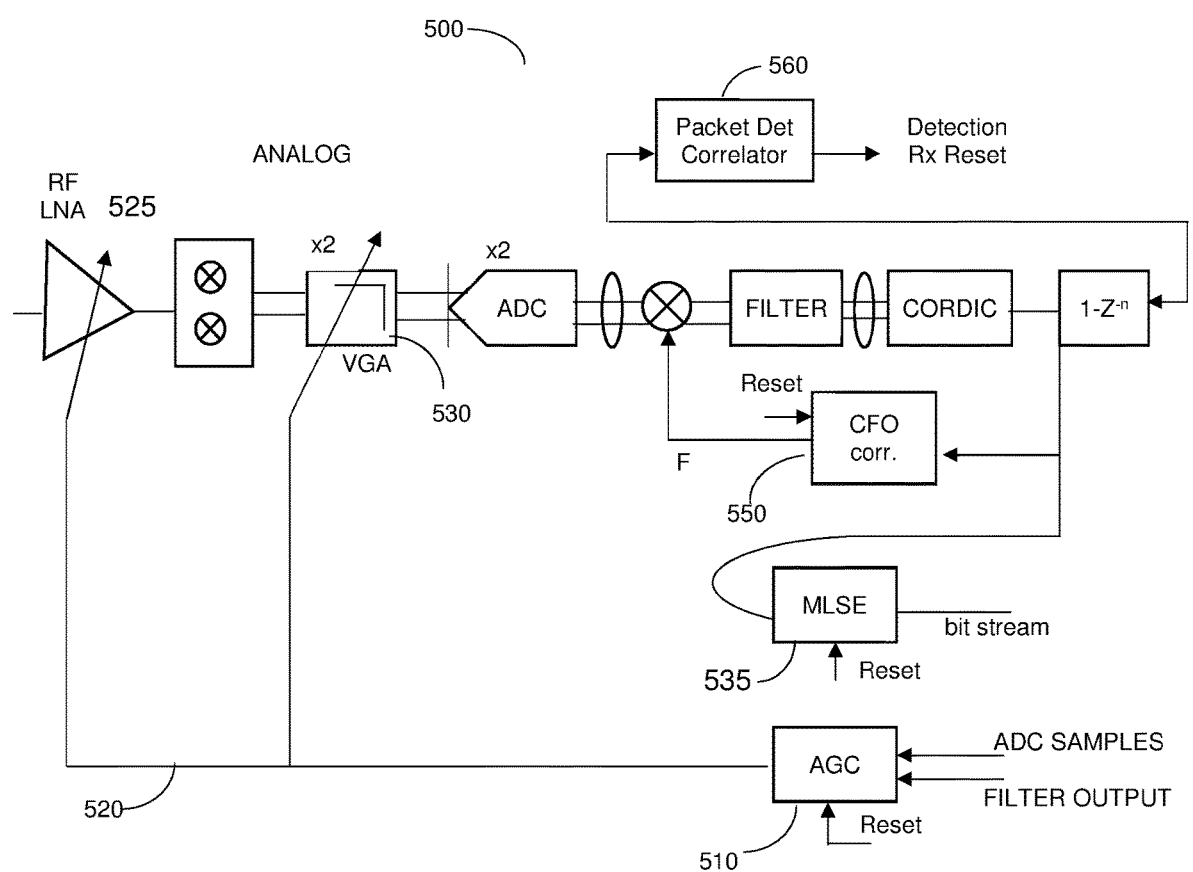
FIG. 5 is a block diagram of a receiver architecture operable in a master or device for a wireless receiver.
Figure 6:
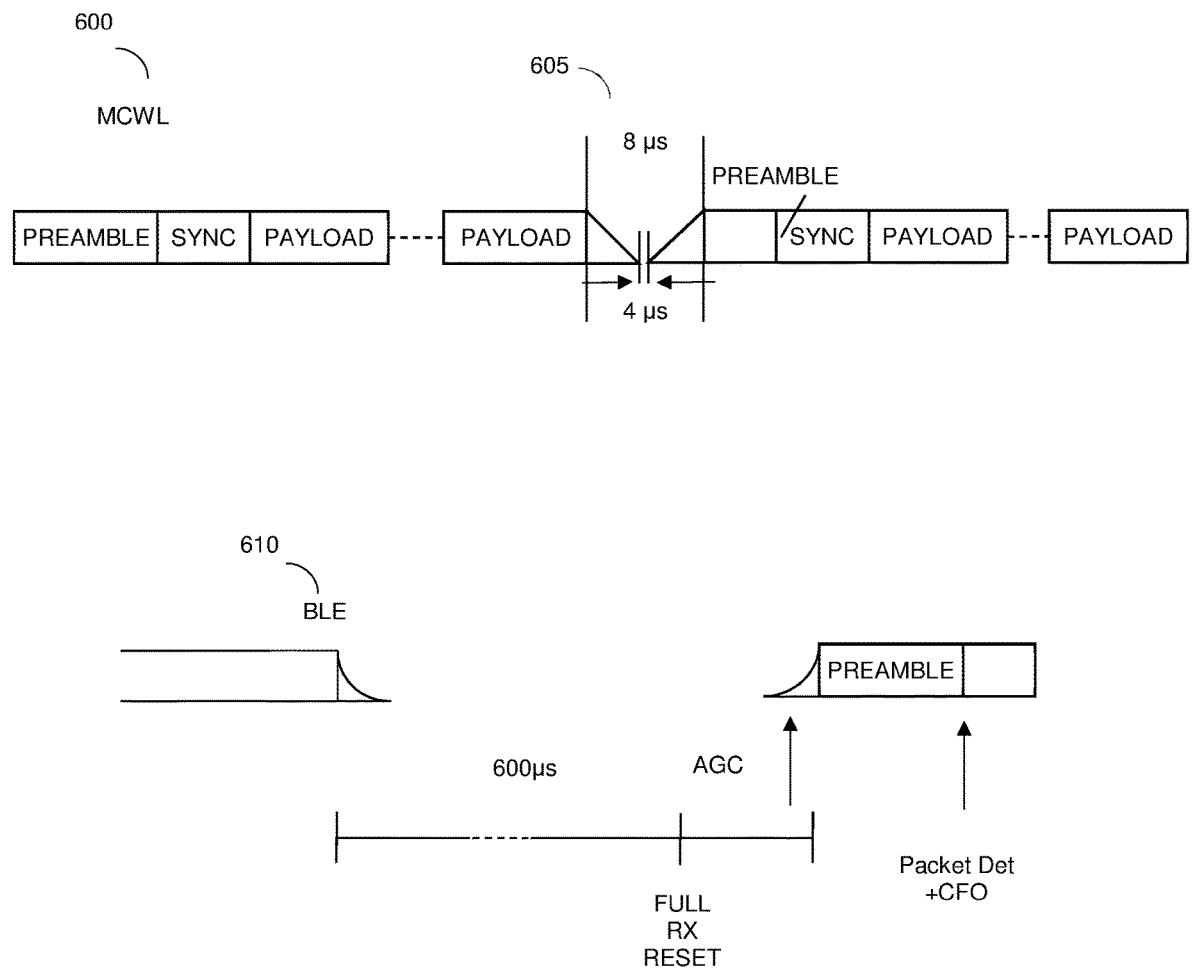
FIG. 6 is a diagram of the timing differences between an IO-Link and a BLE implementation.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments disclosed herein include a master gateway and method thereof operable in a mission critical wireless link (MCWL) system. The master gateway is configured of receiving a closely spaced stream of packets (TDM) with a single receiver. In an embodiment, the master gateway implements multiple tracks with a single receiver for each track, without hindering performance. Further, each component within the receiver receives control signals (i.e., reset signals) based on an exact protocol timing of the packets within a stream of received packets.

Figure 7:
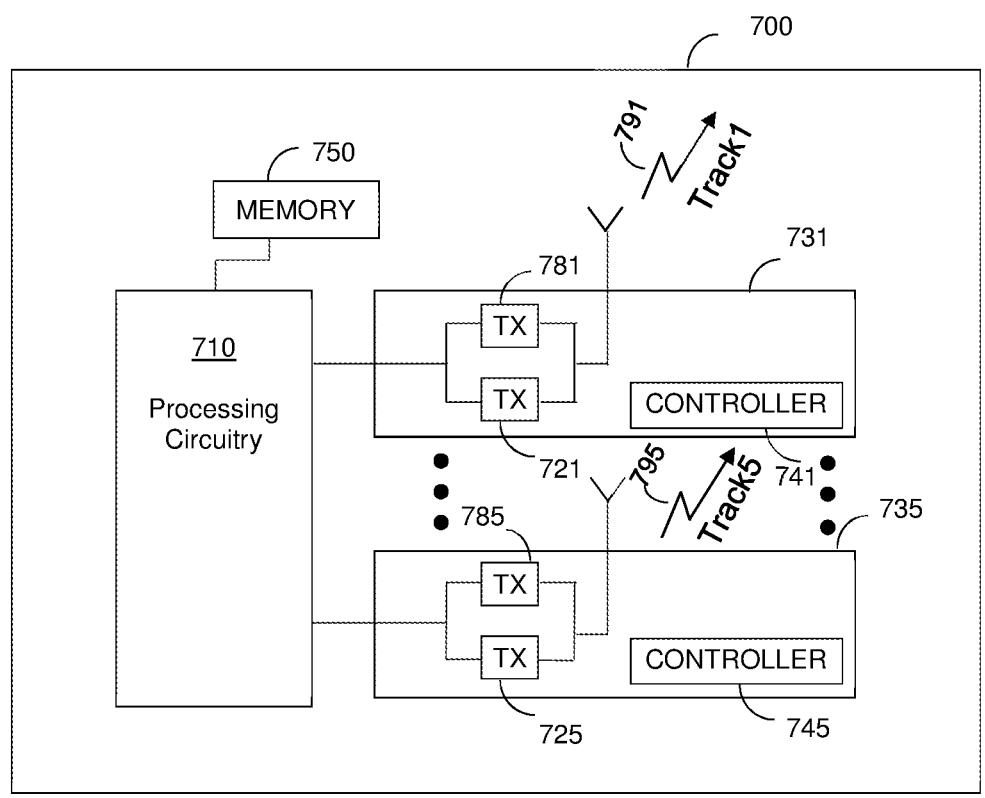
FIG. 7 is a diagram of the master gateway of a mission critical wireless link system according to an embodiment.

FIG. 7 is a diagram of a master gateway (or simply "master") in accordance with an embodiment. The master 700 is operable in a mission critical wireless link (MCWL) system. The master 700 is operable in accordance with the IO-Link Wireless standard as defined in "IO-Link Wireless System Specification", first version published in March 2018. The master 700 includes a processing circuitry 710, a plurality of transceivers 731 through 735, and a memory 750. The master 700 communicates over multiple tracks 791 through 795 with a single transceiver 731 through 735 dedicated to each track. Each transceiver 731 through 735 contains a single transmitter 781 through 785, a single receiver 721 through 725 and a single synchronous modem controller 741 through 745. Each transceiver 731 through 735 also includes a single radio. In an example embodiment, each transceiver 731 through 735 is configured to receive and transmit wherein the at least one of the plurality of receivers is configured to receive a GFSK modulated signal.

It should be noted that while five transceivers are shown in the example implementation of FIG. 7, this is by no means meant to limits the number of transceivers possible to be implemented in the current disclosure, and is merely used an a non-limiting example.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, and the like, or any other hardware logic components that can perform calculations or other manipulations of information.

The memory 750 may be volatile (e.g., RAM, etc.), non-volatile (e.g., ROM, flash memory, etc.), or a combination thereof. In one configuration, computer readable instructions to implement one or more embodiments disclosed herein may be stored in the memory 750.

In another embodiment, the memory 750 is configured to store software. Software shall be construed broadly to mean any type of instructions, whether referred to as software, firmware, middleware, microcode, hardware description language, or the like. Instructions may include code (e.g., in source code format, binary code format, executable code format, or any other suitable format of code). The instructions, when executed by the one or more processors, cause the processing circuitry 710 to perform the various processes described herein.

According to an embodiment, the master 700 wirelessly communicates with a plurality of devices (not shown) through tracks 791 through 795 using transceivers 731 through 735, respectively. The timing synchronization of transceivers 731 through 735 with the devices (not shown in FIG. 7) is controlled by synchronous modem controllers 741 through 745. That is, devices are synchronized to transceivers 731 through 735 using controllers 741 through 745 over the multicast downlink. The transceivers 731 through 735 within the master are all synchronized to the same circuit trigger (e.g., a strobe on each sub-cycle) using the processing circuitry 710. As demonstrated herein, the architecture of master 700 is based on a single receiver per transceiver and track, thereby simplifying the implementation and making it significantly more cost effective.

Figure 8:
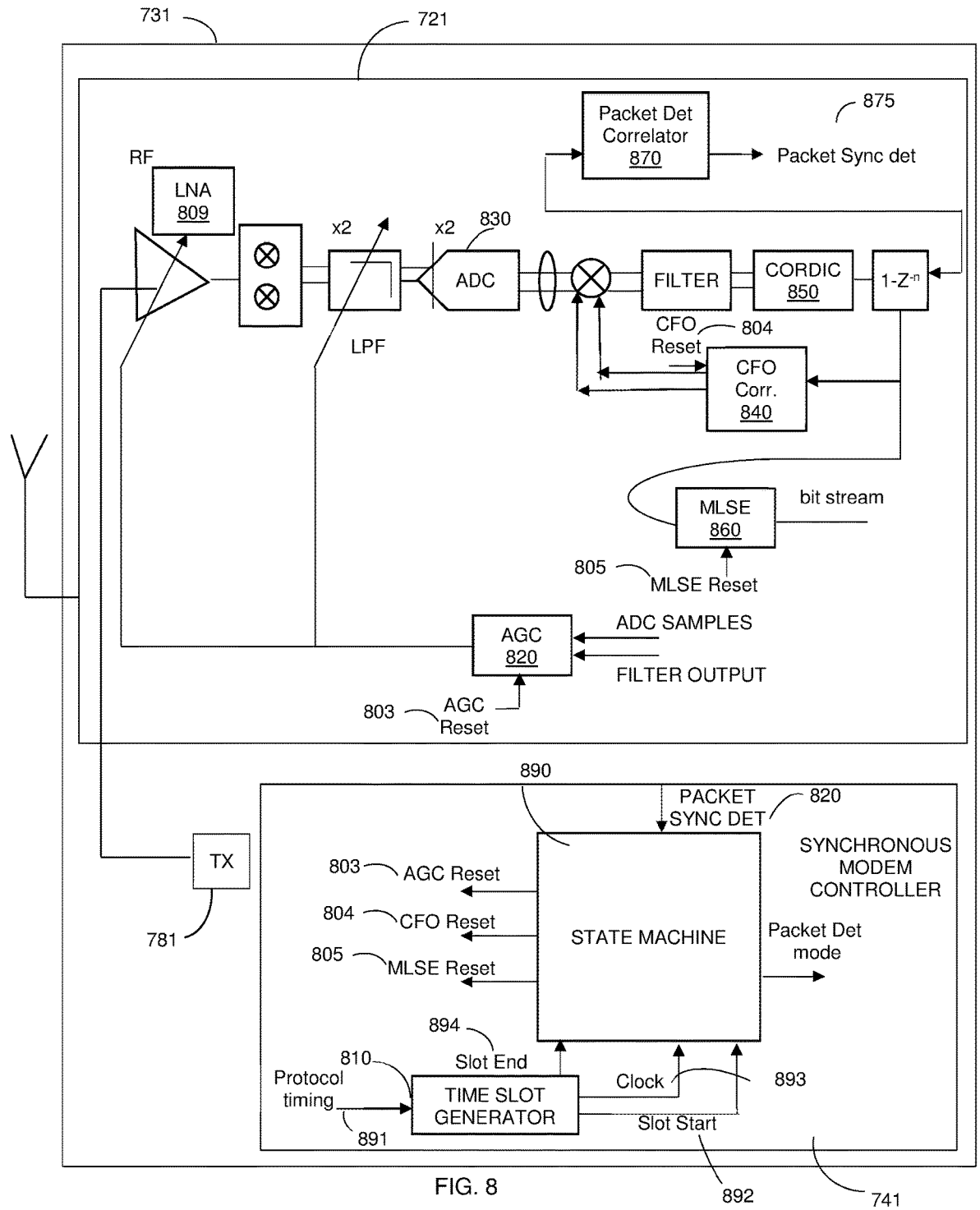
FIG. 8 is a block diagram of a receiver in a master gateway according to an embodiment.

FIG. 8 is an example block diagram of a transceiver 731 within a master 700 according to an embodiment. It should be noted that transceivers 731 through 735 are identical. As mentioned above, a transceiver 731 includes a receiver 721, a transmitter 781 and a synchronous modem controller 741.

The receiver 721 also includes components required for processing received packets. Such components include an AGC 820, an LNA 809, a CFO correction 840, a CORDIC transform 850, a maximum likelihood sequence estimator (MLSE) 860, and a packet detector 870.

In an example embodiment, the synchronous modem controller 741 includes a state machine 890 and a time slot generator 810. In an embodiment, the time slot generator 810 is configured to generate three indications, namely: a slot start 892 (indicating the start of a slot), a slot end 894 (indicating the end of a slot), and a clock 893. The slot generator 810 is further configured to receive protocol timing signal 891 from the processing circuitry 710. The three output signals are derived from the protocol timing signal and pre-configured protocol timing implementation.

In an embodiment, the state machine 890 is configured to receive the slot start 892, slot end 894 and clock 893 signals from the time slot generator 810 as well as a packet sync detection signal 820 from a packet detector 870 indicating that a packet sync-word has been detected.

In an embodiment, the state machine 890 is configured to output three control signals (reset signals in this case), namely: an AGC reset 803 to the AGC block 820, a CFO reset 804 to the CFO correction block 840, and a MLSE reset 805 to the MLSE decoder 860.

According to the disclosed embodiments, the state machine 890 is configured to trigger the reset signals 803, 804, and 805 so as to allow resetting the operations of the various receiver's 721 components at specific time slots to allow for processing multiple packets simultaneously.

To this end, the state machine 890 effectively follows the packet tail through the receiver 721 chain using pre-programmed estimated delays of the various blocks and the packet detection signal 820 and slot start 892 and slot end 894 signals. After the tail of the preceding block has cleared each block within the chain, the state machine 890 initiates a reset to the cleared block. This mechanism is required since the processing delay of the receiver is substantially longer than the guard time between two packets. Therefore, in order to receive multiple packets in sequence, the receiver must allow several concurrent configurations for its sub-blocks.

Figure 9:
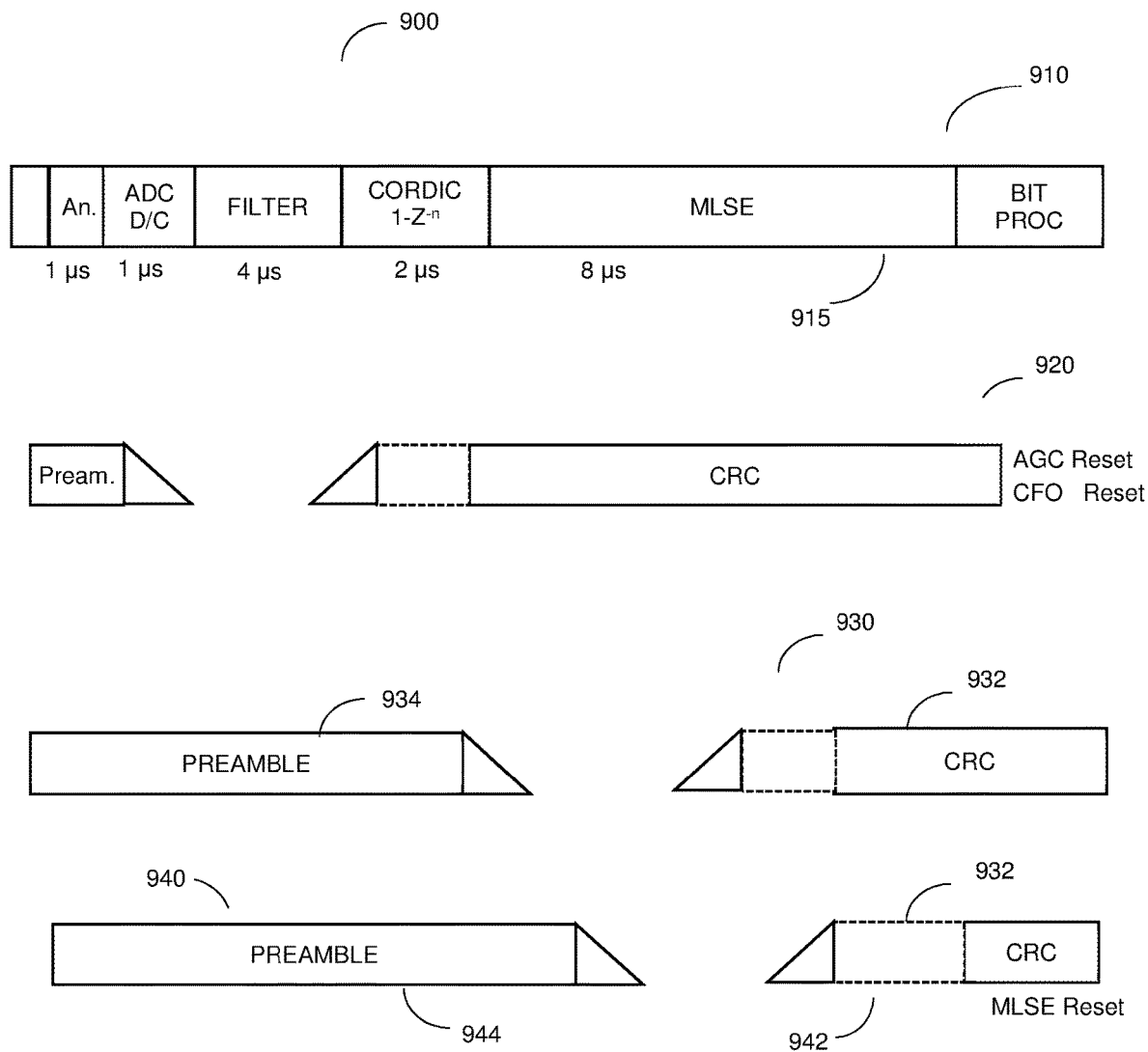
FIG. 9 is a timing diagram of the operation and timing of various reset signals executed by a receiver within a master gateway according to an embodiment.

For example, after the tail has cleared the filter, the AGC block 820 receives a reset signal because both its inputs (i.e., ADC samples and filter output) are now free to process the next packet. FIG. 9 is an example timing diagram 900 of the operation and timing of various reset signals executed by sub-blocks within the receiver of a master, e.g., the receiver 721 of FIGS. 7 and 8, according to an embodiment. The timing of various reset signals is controlled by the synchronous modem controller 741.

In the example FIG. 9, the timelines show the packet timings in the air as they advance. The timeline proceeds from right to left, meaning that more recent events are shown on the left. On the top timeline, delays 915 within the processing chain 910 are shown. An analog delay is less than 1 μs, an analog-to-digital converter (ADC), down conversion, and CFO correction delays are approximately 1 μs, the low pass filter (LPF) delay is approximately 4 μs, the CORDIC and phase differentiator delay is approximately 2 μs, and the MLSE receiver delay is approximately 8 μs. The CORDIC calculates the phase of a cartesian IQ input. The total processing delay is therefore roughly 16 us, which is substantially longer than the 4-8 us guard time between the packets.

The second timeline 920 shows the two packets' structures in a certain time instance. As shown in timeline 920, the preceding packet has already cleared the analog ADC and filter components but is still being processed by the subsequent blocks (e.g., CORDIC and MLSE). At this time instance, the state machine 890 asserts a reset signal to the AGC block via control line 803 because both its inputs (i.e., ADC samples and filter output) will not see the new incoming packet. The AGC will shift to maximum gain, preserving the modem sensitivity level. The CFO correction is reset via a control line 804 since its output to the rotator before the filter now affects the new incoming packet, but does not affect the preceding packet.

The following timeline 930 illustrates a new packet 934 propagating through the receiver 721 while a previous packet 932 is still being processed. The MLSE and bit processing blocks processes the preceding packet, while the rest of the blocks process the new incoming packet and the AGC and CFO blocks have already been reset.

The final timeline 940 shows processing of the previous packet 942 being completed while the next packet 944 is being processed by the modem control block. Since the previous packet 942 has already been processed by the MLSE 860, an MLSE reset is asserted for the MLSE 860 through control signal 805.

Figure 10:
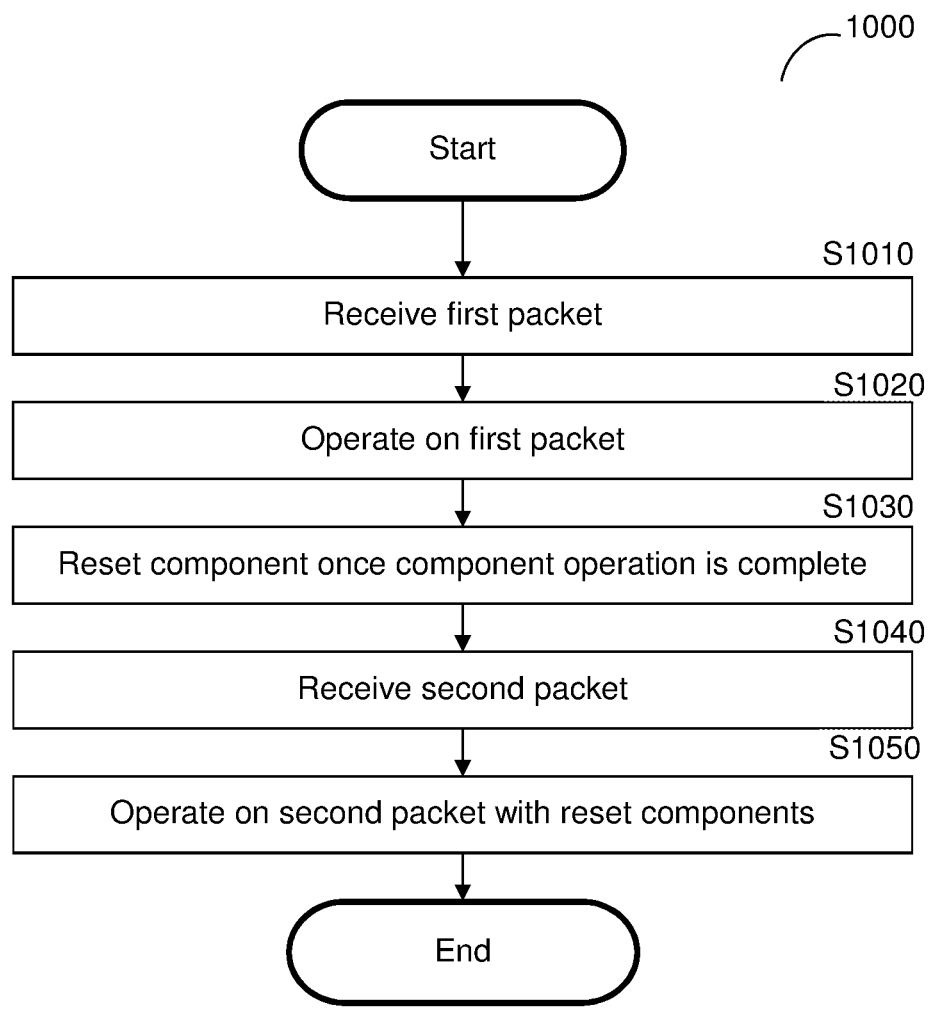
FIG. 10 is a flowchart illustrating a method of operating synchronous modem control block within a receiver in accordance with an embodiment.

FIG. 10 is an example flowchart 1000 illustrating a method for receiving multiple packets in sequence with a single receiver according to an embodiment. As an example, the process of receiving the first two packets is shown. At S1010, a first packet is received, e.g., over a wireless medium of a mission critical wireless link, by a master from a device within a mission critical wireless system.

At S1020, a first received packet is operated on. The operation may include applying various filters, automatic gain control, carrier frequency offset correction, maximum likelihood sequence estimation, and the like, to a received wireless packet.

At S1030, each component of the receiver used for an operation is reset once its operation on the preceding packet is complete. The timing of the reset is based on an external clock, e.g., a slot time generator, which compares the timing to an a priori known protocol timing. In an embodiment, the end of the packet is further determined based on counting bits of the first packet as well as relying on a predetermined expected silence delay, e.g., an 8 μs delay, between packets.

At S1040, a second packet is received, and at S1050, the second packet is processed using receiver components that have been already reset at S1030. The second packet may be processed while the first packet is still being operated on by different receiver components.

Following is a non-limiting example for the operation of the method. A first packet is detected by a receiver and decoded. Then, one or more of the receiver's components are reconfigured when its operation on the decoded first packet is completed. In the next phase, a second packet is detected and decoded using the reconfigured component (s). The decoding can be performed using Gaussian frequency-shift keying (GFSK). It should be noted that the guard time between the first and second packets is smaller than a receiver's processing time to detect and decode the first and second packets.

Some advantages offered by the disclosed embodiments include requiring only a single transceiver per track, which is configured to handle all packets with a short 8 μs guard time (delay) between two consecutive packets. For example, the processing time Requiring only a single transceiver is more economical, and significantly reduces the cost of the master. Further, the (single) receiver maintains maximal performance even in the most extreme cases of amplitude and frequency offset differences between consecutive packets. Additionally, the blocks are being operated on and reset according to synchronous timing given by the protocol timing, thus allowing the modem to handle two packets propagating through a track of a master.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method of receiving multiple packets in sequence, the method is performed by a receiver, comprising:

detecting a first packet;
   decoding a first packet;
   reconfiguring at least one component of the receiver when its operation on the decoded first packet is completed;
   detecting a second packet; and
   decoding a second packet with at least one reconfigured component, wherein a guard time between the first packet and second packet is substantially shorter than the receiver processing delay.

2. The method of claim 1, wherein reconfiguring the at least one component further comprises: generating a reset signal.

3. The method of claim 1, wherein the method is repeated for a plurality packets received in a sequence.

4. The method according to claim 1, wherein decoding of any one of the first packet and the second packet further comprises at least one of:

Estimating and correcting a carrier frequency offset (CFO), performing an MLSE decoding, performing an AGC correction, and performing a digital down conversion.

5. The method according to claim 1, wherein decoding of any one of the first packet and the second packet is performed using a GFSK modulation.

6. The method of claim 1, wherein decoding of any one of the first packet and the second packet is performed using the IO-Link Wireless protocol.

7. The method of claim 1, wherein a reconfiguration time of any of the instances are determined by at least one of: an external clock, a slot time generation, a comparison of a clock to an a-priory known protocol timing, and counting bits from the first bit to a known packet length.

* * * * *